(12) United States Patent
Kobrin

(10) Patent No.: US 11,524,478 B2
(45) Date of Patent: Dec. 13, 2022

(54) SELF-CLEANABLE TRANSPARENT CONDUCTIVE SURFACE/FILM

(71) Applicant: Metamaterial Technologies USA, Inc., Pleasanton, CA (US)

(72) Inventor: Boris Kobrin, Pleasanton, CA (US)

(73) Assignee: Metacontinental Inc., Dartmouth (CA)

( * ) Notice: Subject to any disclaimer, the term of this patent is extended or adjusted under 35 U.S.C. 154(b) by 0 days.

(21) Appl. No.: 16/612,375

(22) PCT Filed: May 10, 2018

(86) PCT No.: PCT/US2018/032080
§ 371 (c)(1),
(2) Date: Nov. 9, 2019

(87) PCT Pub. No.: WO2018/209098
PCT Pub. Date: Nov. 15, 2018

(65) Prior Publication Data
US 2020/0199754 A1   Jun. 25, 2020

Related U.S. Application Data

(63) Continuation of application No. 15/592,125, filed on May 10, 2017, now abandoned.

(51) Int. Cl.
C23C 18/16 (2006.01)
C23C 18/22 (2006.01)
(Continued)

(52) U.S. Cl.
CPC ............... *B32B 3/30* (2013.01); *B32B 3/02* (2013.01); *B32B 15/02* (2013.01); *B32B 15/04* (2013.01);
(Continued)

(58) Field of Classification Search
CPC .. B32B 3/30; B32B 3/02; B32B 15/04; B32B 15/02; B32B 2255/205; B32B 2250/02;
(Continued)

(56) References Cited

U.S. PATENT DOCUMENTS

| 7,258,731 B2 | 8/2007 | D'Urso et al. |
| 8,192,920 B2 | 6/2012 | Kobrin |

(Continued)

FOREIGN PATENT DOCUMENTS

| RU | 2593463 C2 | 8/2016 |
| WO | 2011025281 A1 | 3/2011 |
| WO | 2012078765 A2 | 6/2012 |

OTHER PUBLICATIONS

Harinarayanan Puliyalil et al., "Selective Plasma Etching of Polymeric Substrates for Advanced Applications," Nanomaterials, 6, 108 (2016) (24 pages).

(Continued)

*Primary Examiner* — David Sample
*Assistant Examiner* — Donald M Flores, Jr.
(74) *Attorney, Agent, or Firm* — Fish & Richardson P.C.

(57) ABSTRACT

A self-cleaning transparent conductive surface includes a hydrophobic film and a metal nano-web coupled to the hydrophobic film. The metal nano-web imparts conductive properties to the surface of the film and texturing formed by either the hydrophobic film, substrate or metal nano-web create a super-hydrophobic surface. This super-hydrophobic and conductive surface may be created by etching and layering a metal nano-web over the surface of a hydrophobic film or a rigid substrate, the metal grid may the hydrophobic film or substrate may also be etched in a moth's eye pattern. Both the hydrophobic film or substrate and metal nano-web may be coated in a layer of hydrophobic material to further increase the hydrophobic effect.

21 Claims, 7 Drawing Sheets

(51) Int. Cl.
 *B32B 3/30* (2006.01)
 *B32B 3/02* (2006.01)
 *B32B 15/04* (2006.01)
 *B32B 15/02* (2006.01)
 *B32B 15/08* (2006.01)
 *B05D 5/08* (2006.01)

(52) U.S. Cl.
 CPC ........... *B32B 15/08* (2013.01); *C23C 18/165* (2013.01); *C23C 18/1605* (2013.01); *C23C 18/22* (2013.01); *B05D 5/083* (2013.01); *B32B 2250/02* (2013.01); *B32B 2255/10* (2013.01); *B32B 2255/205* (2013.01); *B32B 2307/202* (2013.01); *B32B 2307/412* (2013.01); *B32B 2307/73* (2013.01); *B32B 2307/754* (2013.01); *Y10T 428/24612* (2015.01); *Y10T 428/26* (2015.01)

(58) Field of Classification Search
 CPC .......... B32B 2307/412; B32B 2307/73; B32B 2307/202; B32B 2307/754; C23C 18/165; Y10T 428/26; Y10T 428/24612
 See application file for complete search history.

(56) References Cited

U.S. PATENT DOCUMENTS

| | | |
|---|---|---|
| 8,518,633 B1 | 8/2013 | Kobrin |
| 9,481,112 B2 | 11/2016 | Kobrin et al. |
| 9,645,504 B2 | 5/2017 | Kobrin et al. |
| 2006/0024478 A1* | 2/2006 | D'Urso ............ G01N 33/54393 428/156 |
| 2010/0177384 A1* | 7/2010 | Peroz .................... H05B 33/22 428/156 |

OTHER PUBLICATIONS

S Zanini et al., "Development of super-hydrophobic PTFE and PET surfaces by means of plasma process," J. Phys.: Conference Series, 550, 012029 (2014) (10 pages).

International Search Report and Written Opinion in PCT/US2018/032080, dated Sep. 20, 2018.

U.S. Appl. No. 15/592,125, filed May 10, 2017.

* cited by examiner

SELF-CLEANABLE TRANSPARENT CONDUCTIVE SURFACE/FILM

CROSS-REFERENCE TO RELATED APPLICATIONS

This application is a U.S. National Stage application of International Patent Application PCT/US2018/032080, filed May 10, 2018, which claims the benefit of priority of U.S. patent application Ser. No. 15/592,125, filed May 10, 2017.

FIELD OF THE INVENTION

Aspects of the present disclosure generally relate to conductive hydrophobic surfaces and more particularly to a surface that is conductive, resistant to fog and ice, and is self-cleaning.

BACKGROUND OF THE INVENTION

Windows and other transparent surfaces act as barriers for dirt and other contaminants while freely passing light through. It is desirable to keep windows free from dirt and contaminants on their surface which would prevent the free passage of light. Surfaces that are roughened with nano to microscale structures may cause water or other liquids to ball up and roll off of the surface or bounce on impact with the surface. Surfaces with these nano to microscale structures are difficult to wet and therefore are also very easy to clean. Surfaces with this interaction with liquids have a contact angles between the surface and the liquid droplet of greater than 150 degrees and a roll off angle hysteresis of less than 10 degrees. These surfaces are referred to as superhydrophobic. It has been found that surfaces with nanostructures that are smaller than the wavelength of visible light prevents reflections by inducing a continuous refractive index gradient between the air and the surface effectively removing the air-lens interface. This structure is referred to as a moth's eye structure or a moth eye type anti reflective structure.

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
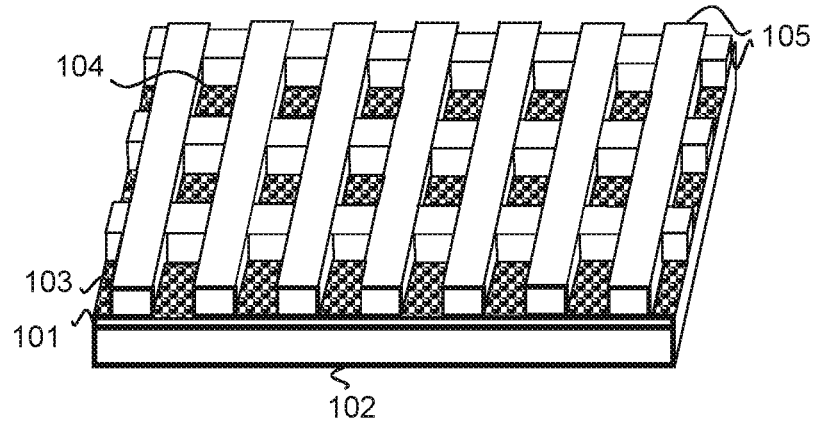
FIG. 1 is a diagram of the super hydrophobic conductive surface according to an embodiment of the present disclosure.

According to an aspect of the present disclosure, FIG. 1 depicts a super hydrophobic and conductive surface composed of various layers of materials. According to aspects of the present disclosure a hydrophobic layer 101 is provided. The hydrophobic layer 101 may be any suitable hydrophobic material; preferably the material is inert, unreactive to most solvents, and capable of being made transparent. In one embodiment of the present disclosure the material 101 is PTFE or a PTFE-like fluoropolymer such as Poly(chlorotri-flouroethylene) (PCTFE), polyvinylidene fluoride (PVDF), ethylene tetrafluoroethylene (ETFE), etc. The hydrophobic layer 101 may be an independent film or coupled to a substrate layer 102. The substrate layer 102 may be a transparent material such as glass, semiconductor or polymer, or other transparent to visible, UV or IR light, to provide strength while also allowing electromagnetic radiation (light) to pass through the hydrophobic material. A grid or web-like structure of metal lines on the order of micrometers or nanometers may be used to make the surface of the hydrophobic layer or substrate conductive, hereinafter referred to as a nano-web.

Figure 9A:
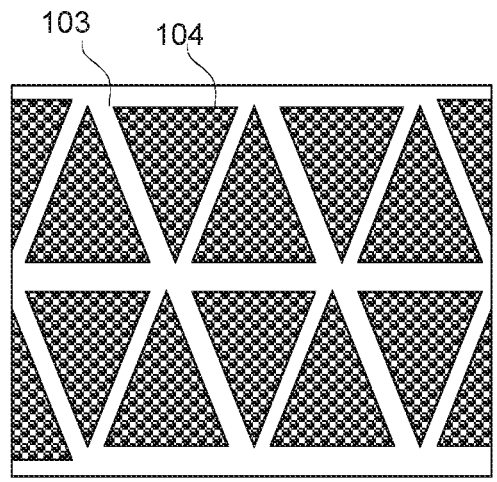
FIG. 9A shows a top down view diagram of a superhydrophobic conductive surface having a hexagonal metal nano-web configuration.
Figure 9B:
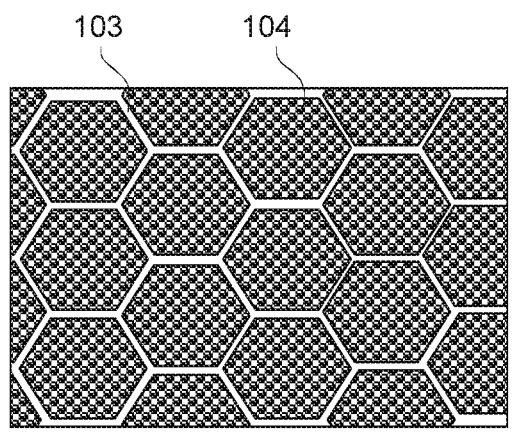
FIG. 9B shows a top down view diagram of a superhydrophobic conductive surface having a triangular metal nano-web configuration.

According to embodiments of the present invention a metal nano-web 103 is fabricated on one side of the hydrophobic layer 101. The nano-web 103 may form mesh or grid pattern with the hydrophobic layer 101 exposed in open spaces 104. Within the exposed spaces 104 may be additional geometric structures that impart superhydrophobicity to the surface and/or create an anti-reflective surface. Alternatively as seen in FIGS. 9A and 9B the hydrophobic layer 101 may be exposed 104 in hexagon or triangle or diamond, rhomboid, or any other shape that provides suitable exposure of the hydrophobic layer 101. The width (linewidth), pitch and thickness of the metal nano-web 103 should be selected such that the metal lines are not visible to the naked eye. In some embodiments of the present disclosure the distance between the center of each metal line and adjacent the center of metal lines in the nano-web (hereinafter referred to as the pitch) should be greater than 100 micrometers to create a sufficiently transparent surface. Similarly the width of each metal line 105 in the metal grid 103 should be chosen such that it does not interfere with passage of light through the hydrophobic material 101. If the width of each metal line is sufficiently small, the metal grid lines 105 may be indistinguishable to the human eye. In a preferred embodiment of the present disclosure the width of the metal lines 105 is less than 3 micrometers and the thickness or height of the lines from the surface of the hydrophobic material is less than 2 micrometers.

The formation of a nano-web upon a hydrophobic layer may create a super hydrophobic surface that is also conductive, if the nano-web is sufficiently sized. According to aspects of the present disclosure to create a super-hydrophobic surface with the metal nano-web, the nano-web must have a pitch between 0.2 and 20 micrometers and a line width that is 30 to 70% of the pitch. A sufficiently hydrophobic material such as Silver may be chosen to ensure that the surface is superhydrophobic. Alternatively if the metal is not sufficiently hydrophobic, the metal nano-web may be coated with a thin hydrophobic coating. For example a gold nano-web may be coated with thiol monolayer, or another metal could be coated with fluorinated silane monolayer or Pyraline or other hydrophobic agent. It should be noted that a decrease in the pitch of the metal nano-web will also decrease the transparency of material and increase haze, thus this approach is more appropriate for non-visual applications (like for electro-optical detectors, for UV or IR spectrum, etc.)

The combination of conductivity and super hydrophobicity has use in many applications and creates a surface that may be self-cleaning by repelling contamination. Such a surface may be useful in the creation of monitors, displays, TVs, touchscreens, smart windows, radars, etc. The properties of this surface would also allow for the material to be self-cleaning and resistant to fog and ice (e.g., through joule heating of the metal nano-web 103), EMI shielding and transparent antennas.

According to other aspects of the present disclosure the anti-fog capabilities of the conductive hydrophobic surface may be enhanced by the addition of geometric structures between the metal lines 104 and formed out of the hydrophobic material 101. In some implementations, the geometric shapes may form a moth's eye pattern to enhance the anti-reflective properties of the resulting structure.

Figure 2:
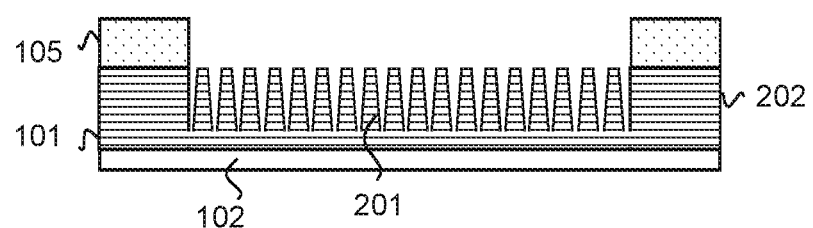
FIG. 2 is a side view diagram of the super hydrophobic conductive surface including the moths-eye anti-fog structure according to an embodiment of the present disclosure.

FIG. 2 depicts an example of a transparent conductive superhydrophobic structure according to aspects of the present disclosure. In this example a pattern of metal lines 105 is formed on the hydrophobic layer 101. A pattern of structured features 201 is formed from the hydrophobic layer in between the metal lines 105. The features 201 may have a depth or thickness that is 1 to 10 times the distance between the center of each structure less the diameter of each structure.

Figure 3:
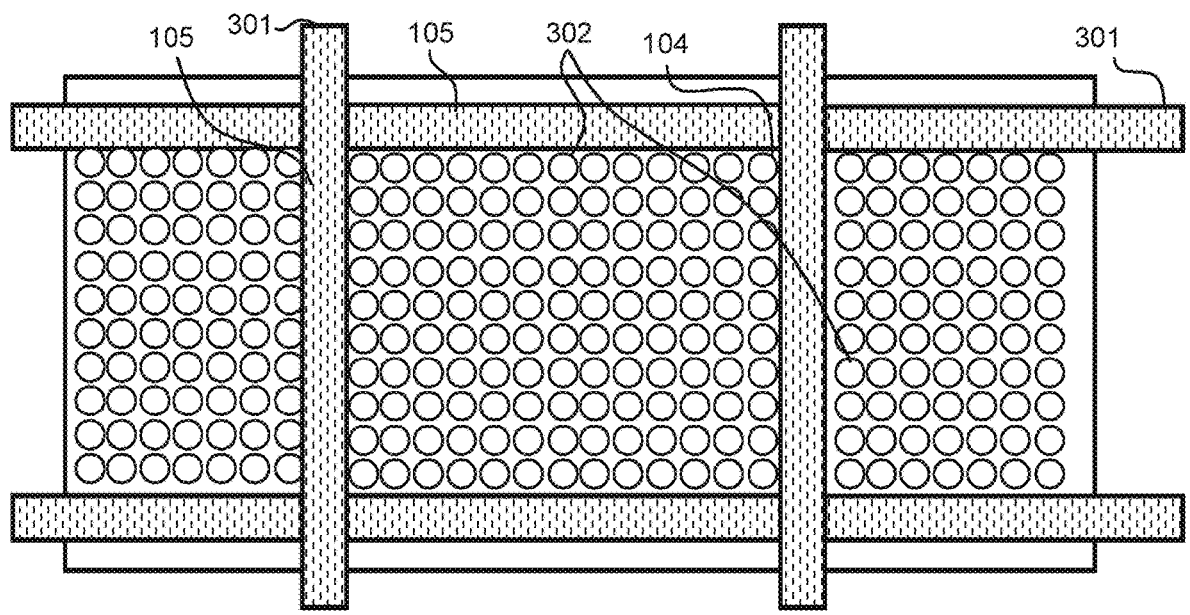
FIG. 3 is a top down view diagram super hydrophobic conductive surface including the moths-eye anti-fog structure according to an embodiment of the present disclosure.

FIG. 3 shows a top-down view of the embodiment in FIG. 2. In this example, structures 201 in the shape of truncated cones may be aligned within the spaces between the metal lines 105 in a nano-web. There may be many cylindrical structures in a single space in the nano-web. The example depicted in FIG. 3 shows a 13 column by 9 row arrangement of truncated conical structures but there may be embodiments with 100s or 1000s of structures. To achieve superhydrophobicity it is desirable for adjacent structures 201 to be connected to each other at their bases or, alternatively, for the density of the structures to be high and area of flat surface between structures at the bottom to be minimized. In one embodiment structures are arranged within the spaces of the nano-web in a 50 column by 50 row grid. In addition, the structures may be other shapes than those illustrated, e.g., pyramids, truncated pyramids, cones, cylinders, pillars, and the like. The nano-web lines 105 may run along the border between each of the arrangements 302 of structures 201. The nano-web lines 105 are electrically coupled to wire contact points 301 at the terminal ends of each of the lines for connection of the metal grid to a power source, electrical detection device or other such apparatus so that the nano-web can be heated by passing electrical current through it.

Figure 4:
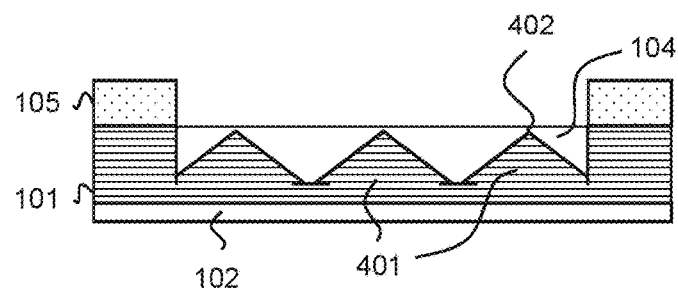
FIG. 4 is a side view diagram of the super hydrophobic conductive surface including the moths-eye anti-fog structure according to another embodiment of the present disclosure.
Figure 5:
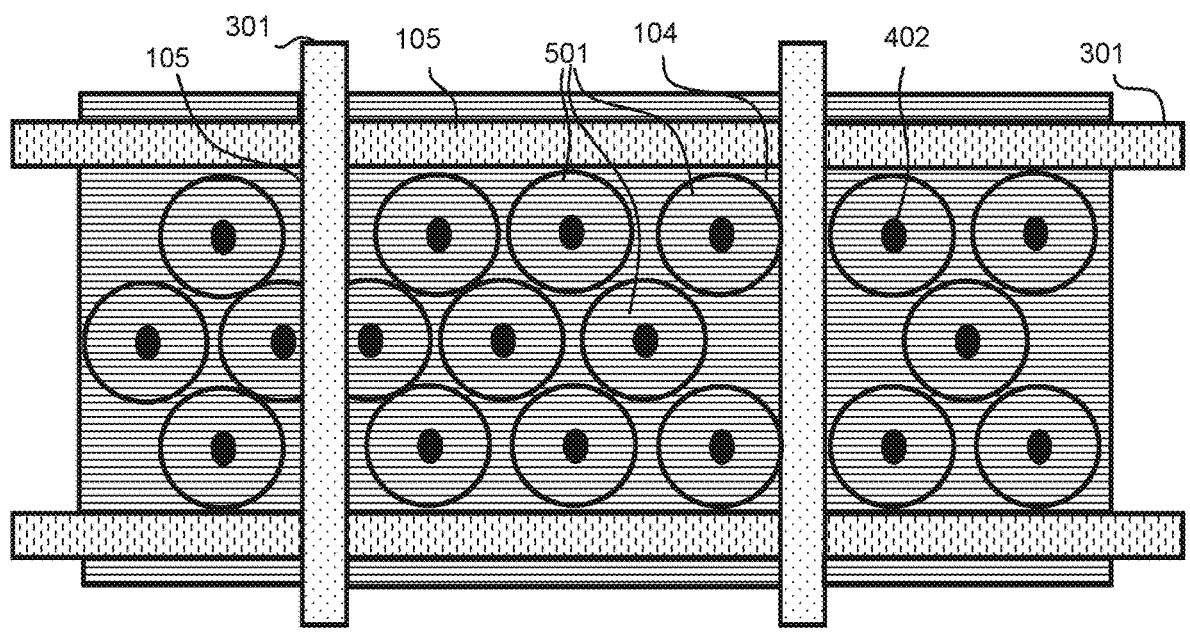
FIG. 5 is a top down view diagram super hydrophobic conductive surface including the moths-eye anti-fog structure according to another embodiment of the present disclosure.

FIG. 4 depicts another embodiment of the present disclosure. In this embodiment the geometric structures 401 are formed in the hydrophobic layer 101 are substantially conical in shape and arranged such that the tip of the structure 402 is on the same side of the hydrophobic layer as the metal nano-web lines 105. According to other aspects of the present disclosure, there may be more than one geometric structure 401 formed from the hydrophobic layer 101. The conical structures may have a height or depth that is 1 to 10 times the distance between the edge of each structure in the hydrophobic layer. Each structure may have a diameter that is 30 to 70% of the pitch (e.g., center-to-center spacing) of the structures. As depicted in FIG. 5 multiple rows of conical structures 501 may be arranged within the spaces of the metal nano-web 104. There may be, for example, hundreds to thousands of structures within a single space of the nano-web. Again, the bases of adjacent structures are preferably connected to each other or the density of the structures is sufficiently high and area of flat surface between the bases of the structures is sufficiently small to achieve superhydrophobicity.

According to aspects of the present disclosure there are a number of ways of making transparent conductive superhydrophobic surfaces. These ways generally involve forming a transparent metal nano-web on a surface of a transparent hydrophobic material. The transparent metal nano-web includes a plurality of metal lines and configuring the surface of the transparent hydrophobic material and/or the plurality of metal lines to be superhydrophobic. The order of these two steps depends on the specific implementation and in some implementations parts of both steps make take places simultaneously.

Figure 6:
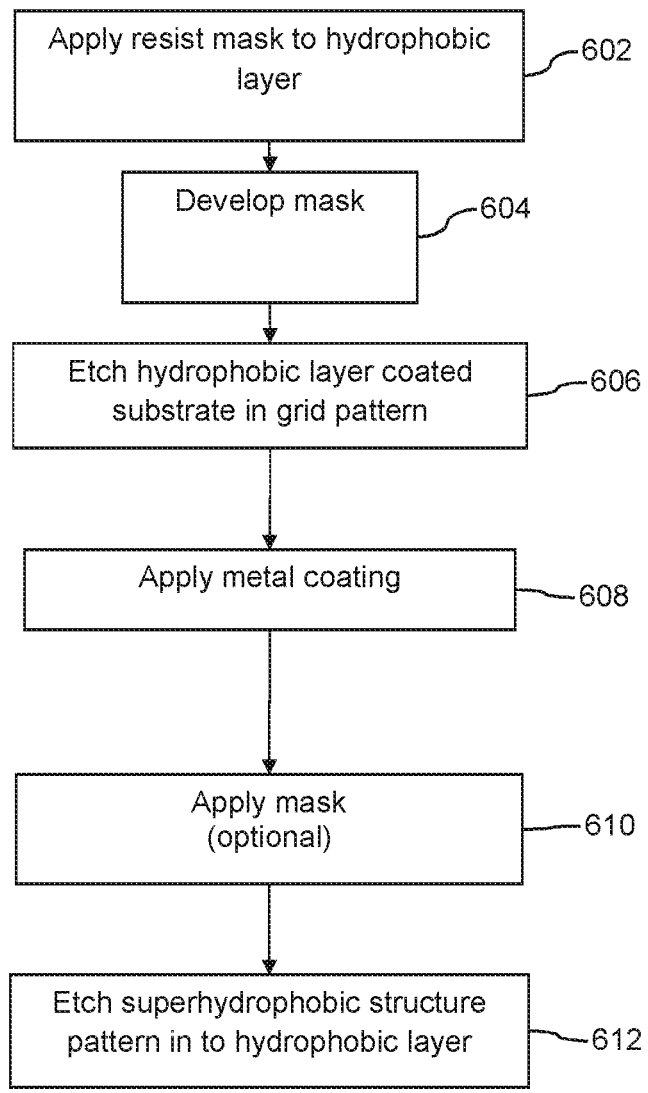
FIG. 6 is a block diagram of a method for making a super hydrophobic conductive surface according to aspects of the present disclosure.

FIG. 6 is a flow diagram illustrating a possible method 600 for forming the super hydrophobic conductive surface according to aspects of the present disclosure. In this example, a hydrophobic material is provided initially as a substrate. The hydrophobic material may be a fluoropolymer such as PTFE, PCTFE, PVDF or the like. The material may be a polymer sheet or coated on another substrate such as glass, crystalline metal, or another polymer. The hydrophobic material may be formed on the substrate by any suitable means, e.g., sputtering, physical vapor deposition (PVD), chemical vapor deposition (CVD), liquid phase deposition, spray coating, spin-coat, dip coating, slot die coating, and the like.

Most fluoropolymers are highly unreactive and have surfaces which are extremely smooth. An important aspect of adhesion of metals to the surface of polymers is mechanical grip strength. As such it is desirable that the hydrophobic layer be roughened before the metal grid is formed on the surface of the material. According to aspects of the present disclosure the hydrophobic layer may first be masked and exposed using a photoresist and a photolithographic process, e.g., rolling-mask lithography (RML), to define the NanoWeb pattern, as indicated at 602. The patterned photoresist layer may then be developed. The exposed portions of hydrophobic material may then be etched as indicated at 606 to improve adhesion of metal. By way of example, and not by way of limitation, the material may be subjected to a very short "sputter-etch" within a PVD chamber to clean-up the surface and slightly roughen it prior to metal deposition to improve adhesion. A metal layer may then be applied to the resulting structure, as indicated at 608. The metal coating may be applied through any known means of metal deposition on to polymer. Examples of such means for deposition of metal on polymer include, Chemical vapor deposition (CVD), Physical vapor deposition (PVD) or sputtering, Electroplating, and electroless electroplating. The metal preferentially deposits to the parts of the hydrophobic surface that have been etched thereby forming a metal web corresponding to the grid pattern of the areas that have been roughened by.

According to other aspects of the present disclosure geometric structures may be formed in and made from the hydrophobic material. By way of example and not by way of limitation, after the metal layer is applied as discussed above, the hydrophobic material and metal grid may optionally be further masked, as indicated at 610 and etched, as indicated at 612 to form the desired structures to make the hydrophobic material superhydrophobic. The mask may be configured to form a moths-eye pattern in the hydrophobic material. The moths-eye pattern may be one or more rows of pyramidal, conical or cylindrical structures formed in the hydrophobic material. There may be one structure per grid space or thousands depending on the spacing of the metal grid pattern. Suitable etching techniques to form the geometric structures include isotropic etch processes, such as anisotropic plasma etching or wet etching with lithography. It is desirable for this etch process to preferentially etch the hydrophobic material rather than the metal grid pattern. For some types of hydrophobic materials and etch processes the structures that make the surface superhydrophobic may be formed without a mask. For example, some types of plasma etch can form patterns of pillars in glass. Adjusting the etch process parameters (e.g., voltage, power, process gasses, etch time) can adjust the diameter and height (or depth) of the pillars.

The above-described method may be advantageous where it is desirable to avoid etching the hydrophobic material in the spaces between the metal lines before forming the superhydrophobic surface. For example, one could blanket etch the hydrophobic material then blanket deposit photoresist, which can be patterned by photolithography to form openings corresponding to the desired grid pattern of metal lines. By way of example, and not by way of limitation, the material may be subjected to a very short "sputter-etch" within a PVD chamber to clean-up the surface and slightly roughen it prior to metal deposition to improve adhesion. For optical applications the etch should be sufficiently mild that the etch does not increase scattering of transparent portions of the hydrophobic material between the metal lines. Metal may then be blanket deposited over the photoresist and onto the hydrophobic material through the openings. The excess metal may then be removed in a so-called "liftoff" process that removes the remaining photoresist and the metal overlying it leaving behind the metal grid. In another variation, one could blanket etch the hydrophobic material then blanket deposit metal over the etched hydrophobic material. The metal can be coated with photoresist which can be patterned by photolithography to form openings corresponding to the desired spaces between the metal lines of the grid pattern. The metal may then be etched through these openings to form the grid pattern. In both of these variations, the hydrophobic material and blanket etch process may be configured to roughen the hydrophobic material so that the metal will adhere while at the same time forming a pattern of structures that make the hydrophobic material superhydrophobic. If this is not practical then a second etch process (patterned or otherwise) that preferentially etches the hydrophobic material may be performed after forming the metal pattern.

Figure 7A:
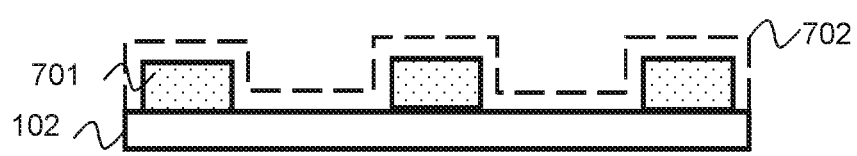
FIG. 7A is a side view of the super hydrophobic conductive surface including metal nano-web that acts as a super-hydrophobic structure according to aspects of the present disclosure.

FIG. 7A depicts another implementation of a superhydrophobic transparent conductive apparatus in accordance with aspects of the present disclosure. In this implementation the substrate 102 has a metal nano-web 701 coupled to its surface that is configured to produce a super hydrophobic effect. By way of example and not by way of limitation the pitch of the metal nano-web may between 0.2 and 20 micrometers with a line width of less than 3 micrometers. A thin layer of hydrophobic material 702 (e.g., an atomic monolayer) is deposited on top of the metal nano-web 701 and the substrate 102. The thin layer of hydrophobic material 702 may for example be a monolayer of Perfluorodecyltrichlorosilane (FDTS).

Figure 7B:
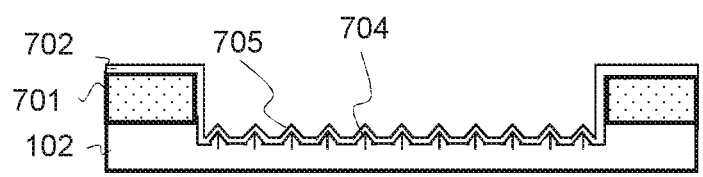
FIG. 7B is a side view of a super hydrophobic conductive surface having a moths-eye anti-fog structure etched in the substrate and coated with a hydrophobic layer according to aspects of the present disclosure.

FIG. 7B depicts an alternative implementation in which the substrate 102 is textured and coated with hydrophobic material to make it superhydrophobic. The substrate may be textured with structures 704 such as cones, square-pyramids, cylinders and the like to form a pattern of structures, e.g., a moths-eye structure, as discussed above. The geometric 704 may be formed by etching the surface of the substrate by any known means.

The geometric structures 704 formed on the surface of the substrate 102 are then coated in a thin layer of hydrophobic material 702, e.g., a self-assembled monolayer, to form superhydrophobic geometric structures in the hydrophobic material 705.

Figure 7C:
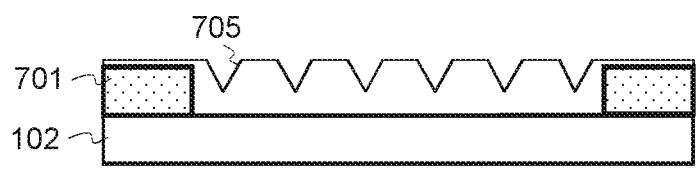
FIG. 7C is a side view of a super hydrophobic conductive surface having a moths-eye anti-fog structure formed in the hydrophobic layer according to aspects of the present disclosure.

FIG. 7C depicts another alternative implementation according to aspects of the present disclosure. In this implementation, a metal nano-web 701 is coupled to the surface of a substrate 102. The nano-web and substrate are then coated with a layer of hydrophobic material 702. In this implementation, the thickness of the hydrophobic material is sufficient to fill the spaces between the metal lines of the nano-web 701. This allows that hydrophobic material to be textured with structures 705 to create a superhydrophobic surface. The structures may be created using nano-imprint lithography on an uncured precursor to the hydrophobic material 705 to imprint the desired pattern of structures into the precursor, which may then be cured to fix the patter into the cured hydrophobic material. Curing could be done by thermally or by exposing the precursor to radiation, e.g., UV light.

Figure 8:
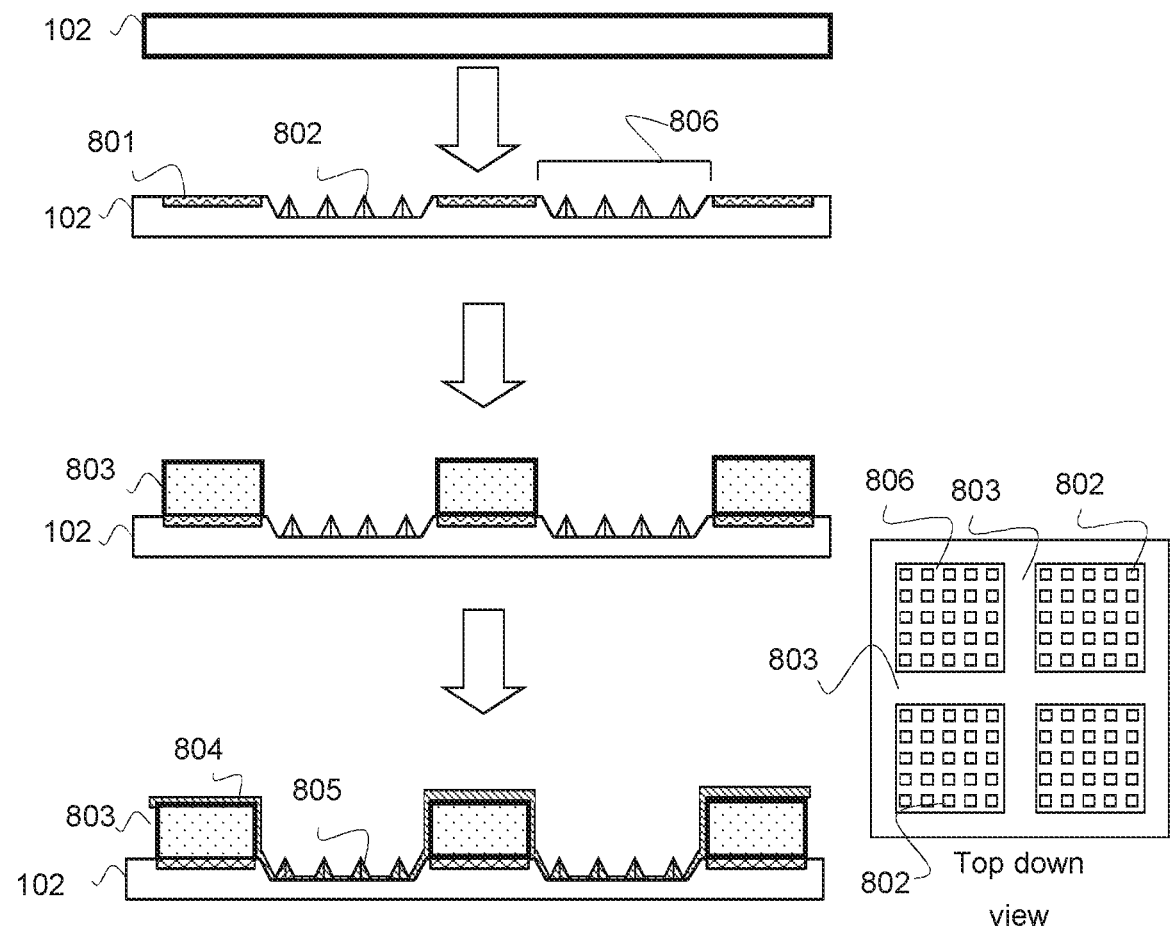
FIG. 8 depicts another method for making a superhydrophobic conductive surface according to aspects of the present disclosure.

FIG. 8 is a method for making embodiments of the present disclosure. The method comprises providing a flat planar substrate 102. The substrate 102 may be a substantially transparent and rigid material such as quartz glass, glass laminate, sapphire glass, a polymer such as Polycarbonate, Polyvinylchloride and the like. Next the substrate 102 may be etched to provide a rough surface 801 to facilitate adhesion of the metal nano-web to the substrate. In the same step or a subsequent step the substrate 102 may be etched to provide a moths-eye anti-reflective structure and to improve the superhydrophobic effect 802 of the final material. Patterned etching may be accomplished by masking the substrate with a photoresist mask. The mask may be applied to the surface of the substrate in continuous process by a rolling mask lithographic process as described in commonly owned U.S. Pat. Nos. 8,518,633B2 and 8,192,920 B2 incorporated by reference herein. The substrate is then anisotropically etched using a plasma etching processes. In the multi-step substrate etching phase a positive photoresist mask showing only the metal nano-web line locations may be applied to the substrate. The substrate may then be exposed to a suitable radiation source and the photoresist is treated with a developer to remove the areas exposed to the radiation. Alternatively a negative photoresist mask may be applied to the substrate showing only the space between the nano-web lines. The substrate may then be subjected to a shallow etch process to provide a rough surface for the metal nano-web to adhere. In a subsequent step a second photo-resist mask is applied to the surface of the substrate and aligned to be within the spaces 806 of the etched web on the surface of the substrate 801. The second mask may be a positive mask or negative mask configured to create the desired moths-eye structure when the mask is developed and the substrate and anisotropic ally etched.

In the single step process, etching to enhance adhesion of the metal nano-web 801 and etching of the moths-eye structures 802 is performed with a single mask. The mask defines both areas where the nanoweb is to adhere 801 and the location of the moths-eye structure. Depth control of the etch may be configured so that the area for the metal nano-web is roughed for adhesion while the Moths-eye structures are produced.

Once the material has been etched the metal nano-web 803 is applied to the surface of the substrate 102 in the etch roughened areas 801. The metal nano-web may be deposited on the surface of the substrate 801 by, Chemical vapor deposition (CVD), Physical vapor deposition (PVD) or sputtering, Electroplating, and electroless electroplating.

Finally the substrate 102 and the metal nano-web 803 is coated with a hydrophobic polymer 804 such as FDTS. The hydrophobic polymer may also coat the moth's-eye structures etched in to the substrate 802 to produce superhydrophobic structures 805 that also act as an anti-reflective coating.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A self-cleaning, transparent, conductive surface comprising:
    a) a layer of transparent hydrophobic material extending along a first plane; and
    b) a transparent metal pattern disposed on portion of the layer of transparent hydrophobic material and extending along a second plane parallel to and distinct from the first plane,
    wherein the transparent metal pattern includes a plurality of metal features comprising a plurality of intersecting metal lines having open spaces therebetween, the transparent hydrophobic material being exposed in the open spaces.

2. The self-cleaning surface of claim 1, wherein the hydrophobic material is coupled to a substrate on a planar surface opposite the transparent metal pattern.

3. The self-cleaning surface of claim 1, wherein a width of each of the plurality of metal features is greater than zero and less than or equal to about 3 micrometers.

4. The self-cleaning surface of claim 3, wherein a pitch of adjacent features in the metal pattern is greater than 100 micrometers.

5. The self-cleaning surface of claim 1, wherein the self-cleaning surface further comprises c) one or more structures formed in the hydrophobic material, the one or more structures being located substantially within the open spaces between the intersecting metal lines of the transparent metal pattern.

6. The self-cleaning surface of claim 5, wherein the one or more structures formed in the hydrophobic material include one or more cones.

7. The self-cleaning surface of claim 6, wherein the one or more cones are oriented with a tip of the one or more cones closer to the surface coupled the transparent metal pattern than a wide base of the one or more cones.

8. The self-cleaning surface of claim 5, wherein the one or more structures formed in the hydrophobic material include one or more pyramids.

9. The self-cleaning surface of claim 8, wherein the one or more pyramids are oriented with a tip of the one or more pyramids closer to the surface coupled to the transparent metal pattern than a wide base of the one or more pyramids.

10. The self-cleaning surface of claim 5, wherein the one or more structures formed in the hydrophobic material include one or more cylinders.

11. The self-cleaning surface of claim 5, wherein a pitch of adjacent structures of the one or more structures is between 0.2 micrometers and 20 micrometers.

12. The self-cleaning surface of claim 5, wherein a diameter of the one or more structures is 30% to 70% of a pitch.

13. The self-cleaning surface of claim 5, wherein the one or more structures are also formed in a transparent substrate coupled to a planar surface of the transparent hydrophobic material opposite the transparent metal pattern.

14. The self-cleaning surface of claim 13, wherein a thickness of the one or more structures is between 1 and 10 times a space between adjacent structures of the one or more structures.

15. The self-cleaning surface of claim 1, wherein the transparent metal pattern is coated with a hydrophobic coating to improve the hydrophobicity of the self-cleaning surface, and optionally, wherein a linewidth, height, and pitch of the plurality of metal features are configured to provide structures that impart super-hydrophobicity to the self-cleaning surface.

16. The self-cleaning surface of claim 1, wherein the hydrophobic material is a fluoropolymer.

17. The self-cleaning surface of claim 1, wherein the plurality of intersecting metal lines forms a web.

18. The self-cleaning surface of claim 17, wherein the web is in the form of a grid.

19. A self-cleaning, transparent, conductive surface comprising:
- a) a transparent hydrophobic material, wherein the hydrophobic material is a fluoropolymer; and
- b) a transparent metal pattern disposed on a first surface of the transparent hydrophobic material, wherein the transparent metal pattern includes a plurality of metal features comprising a plurality of intersecting metal lines having open spaces therebetween, the transparent hydrophobic material being exposed in the open spaces.

20. A self-cleaning, transparent, conductive surface comprising:
- a) a transparent hydrophobic material, wherein one or more cones are formed in the hydrophobic material; and
- b) a transparent metal pattern disposed on a first surface of the transparent hydrophobic material, wherein the transparent metal pattern includes a plurality of metal features comprising a plurality of intersecting metal lines having open spaces therebetween, the one or more cones formed in the transparent hydrophobic material being located substantially within and exposed in the open spaces and are oriented with a tip of the one or more cones closer to the first surface of the hydrophobic material than a wide base of the one or more cones.

21. A self-cleaning, transparent, conductive surface comprising:
- a) a transparent hydrophobic material, wherein one or more pyramids are formed in the hydrophobic material; and
- b) a transparent metal pattern disposed on a first surface of the transparent hydrophobic material, wherein the transparent metal pattern includes a plurality of metal features comprising a plurality of intersecting metal lines having open spaces therebetween, the one or more pyramids formed in the transparent hydrophobic material being located substantially within and exposed in the open spaces and are oriented with a tip of the one or more pyramids closer to the first surface of the hydrophobic material than a wide base of the one or more pyramids.

\* \* \* \* \*